(12) United States Patent  
Neufeld et al.

(10) Patent No.: US 9,167,137 B2  
(45) Date of Patent: Oct. 20, 2015

(54) SECURITY CAMERA HAVING A CABLE ASSEMBLY WITH AN INTEGRATED PROCESSING MODULE

(71) Applicant: Avigilon Corporation, Vancouver (CA)

(72) Inventors: Michael Neufeld, Vancouver (CA); Sudeep Mohan, Surrey (CA)

(73) Assignee: Avigilon Corporation, Vancouver, BC (CA)

( * ) Notice: Subject to any disclaimer, the term of this patent is extended or adjusted under 35 U.S.C. 154(b) by 328 days.

(21) Appl. No.: 13/874,279

(22) Filed: Apr. 30, 2013

(65) Prior Publication Data

US 2014/0320646 A1    Oct. 30, 2014

(51) Int. Cl.
| | |
|---|---|
| H04N 7/18 | (2006.01) |
| G08B 13/196 | (2006.01) |
| H04N 5/225 | (2006.01) |

(52) U.S. Cl.
CPC ........ *H04N 5/2251* (2013.01); *G08B 13/19619* (2013.01); *H04N 7/18* (2013.01)

(58) Field of Classification Search
CPC . H04N 5/2251; H04N 7/18; G08B 13/19619; G08B 13/19617
See application file for complete search history.

(56) References Cited

U.S. PATENT DOCUMENTS

| | | | |
|---|---|---|---|
| 4,746,990 A | 5/1988 | Katoh et al. | |
| 5,418,567 A * | 5/1995 | Boers et al. | 348/375 |
| D399,517 S | 10/1998 | Hasegawa | |
| 6,392,698 B1 | 5/2002 | Yokoyama | |
| 6,476,856 B1 * | 11/2002 | Zantos | 348/151 |
| D467,952 S | 12/2002 | Nakamura | |
| D473,888 S | 4/2003 | Jones et al. | |
| D502,196 S | 2/2005 | Miyazaki | |
| D508,934 S | 8/2005 | Nagai | |
| D516,105 S | 2/2006 | Bradley et al. | |
| D536,011 S | 1/2007 | Dayan | |
| D540,360 S | 4/2007 | Yamakawa | |
| D547,347 S | 7/2007 | Kim | |
| D552,148 S | 10/2007 | Yamakawa et al. | |
| D552,649 S | 10/2007 | Logan et al. | |
| D554,682 S | 11/2007 | Martinez et al. | |
| 7,345,885 B2 | 3/2008 | Boudreaux et al. | |

(Continued)

FOREIGN PATENT DOCUMENTS

| | | |
|---|---|---|
| CA | 2 303 525 | 9/2001 |
| JP | 2005-157681 A | 6/2005 |
| WO | PCT/CA2013/050334 | 4/2013 |

OTHER PUBLICATIONS

Axis Communications, "AXIS P12 Network Camera Series", data sheet; 4 pages.

(Continued)

*Primary Examiner* — WB Perkey  
(74) *Attorney, Agent, or Firm* — Klarquist Sparkman, LLP

(57) ABSTRACT

A security camera includes a camera head and a cable assembly with an integrated processing module. The camera head contains a lens and an image sensor, while the processing module contains image processing circuitry for processing images obtained using the image sensor and power circuitry used to power the image processing circuitry and the camera head. A cable connects the camera head and the processing module. The processing module is sized to fit through an aperture in a mounting surface that can be covered by the camera head when the camera head is mounted to the mounting surface, which facilitates ease of installation.

20 Claims, 10 Drawing Sheets

(56) References Cited

U.S. PATENT DOCUMENTS

| | | |
|---|---|---|
| 7,425,101 B2 | 9/2008 | Cheng |
| D614,222 S | 4/2010 | Yamakawa |
| D628,223 S | 11/2010 | Kao et al. |
| D629,439 S | 12/2010 | Yoshida |
| D633,543 S | 3/2011 | Park |
| D633,931 S | 3/2011 | Ham |
| D648,766 S | 11/2011 | Chen |
| D653,687 S | 2/2012 | Yu |
| D687,085 S | 7/2013 | Manson |
| D690,344 S | 9/2013 | Hollinger |
| D700,232 S | 2/2014 | Ramsay et al. |
| D705,844 S | 5/2014 | Bart et al. |
| 8,764,318 B2 | 7/2014 | Wada et al. |
| 2008/0056709 A1 | 3/2008 | Huang |
| 2008/0136915 A1 | 6/2008 | Iwamura |
| 2011/0064403 A1 | 3/2011 | Nakano et al. |
| 2011/0123189 A1 | 5/2011 | Saito |
| 2011/0293264 A1* | 12/2011 | Sato et al. .................. 396/529 |
| 2012/0008935 A1* | 1/2012 | Cheng et al. ................ 396/535 |
| 2013/0287385 A1 | 10/2013 | Andersson |
| 2014/0092299 A1* | 4/2014 | Phillips et al. .............. 348/376 |
| 2014/0320646 A1* | 10/2014 | Neufeld et al. ............. 348/143 |

OTHER PUBLICATIONS

MOBOTIX Corp., S14 FlexMount Camera, instruction manual; 36 pages.

Co-pending U.S. Appl. No. 29/470,179, filed Oct. 17, 2013 and entitled Miniature Dome Camera.

Co-pending U.S. Appl. No. 29/470,181, filed Oct. 17, 2013 and entitled Miniature Dome Camera.

Co-pending U.S. Appl. No. 29/488,370, filed Apr. 17, 2014 and entitled Spherical Security Camera.

Co-pending U.S. Appl. No. 29/488,369, filed Apr. 17, 2014 and entitled Security Camera Processor.

Co-pending U.S. Appl. No. 29/488,371, filed Apr. 17, 2014 and entitled Enclosure for a Spherical Camera.

MP HD Micro Dome, webpage from URL: http://avigilon.com/products/video-surveillance/cameras/hd-micro-dome/hd-micro-dome-cameras/1-mp-hd-micro-dome.

International Search Report and Written Opinion dated Nov. 18, 2013, issued by the Canadian Intellectual Property Office in corresponding International Patent Application No. PCT/CA2013/050334, filed Apr. 30, 2013. This application has not yet published.

* cited by examiner

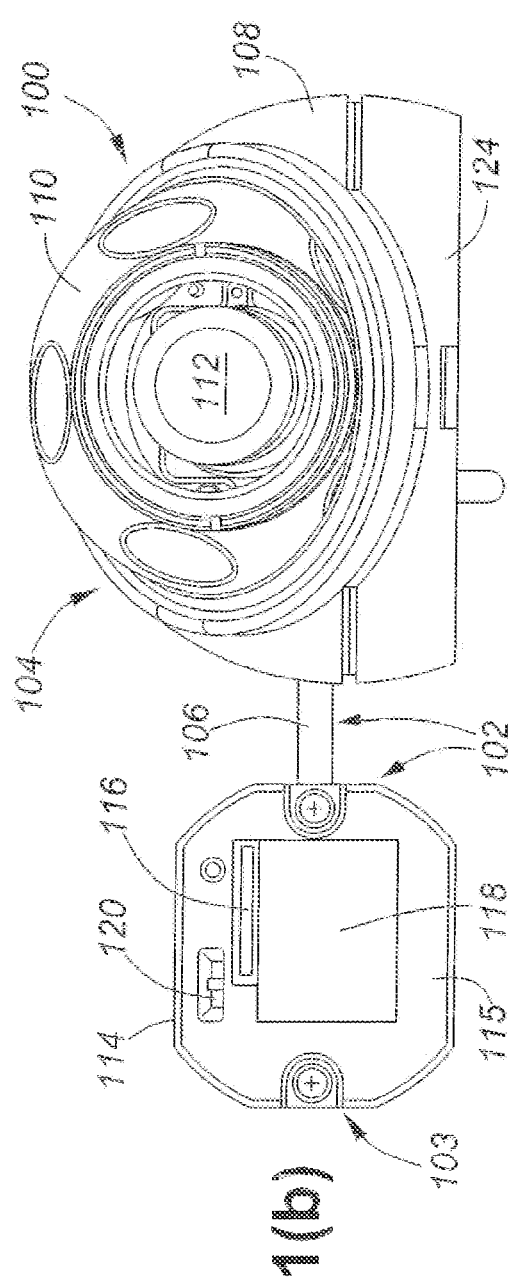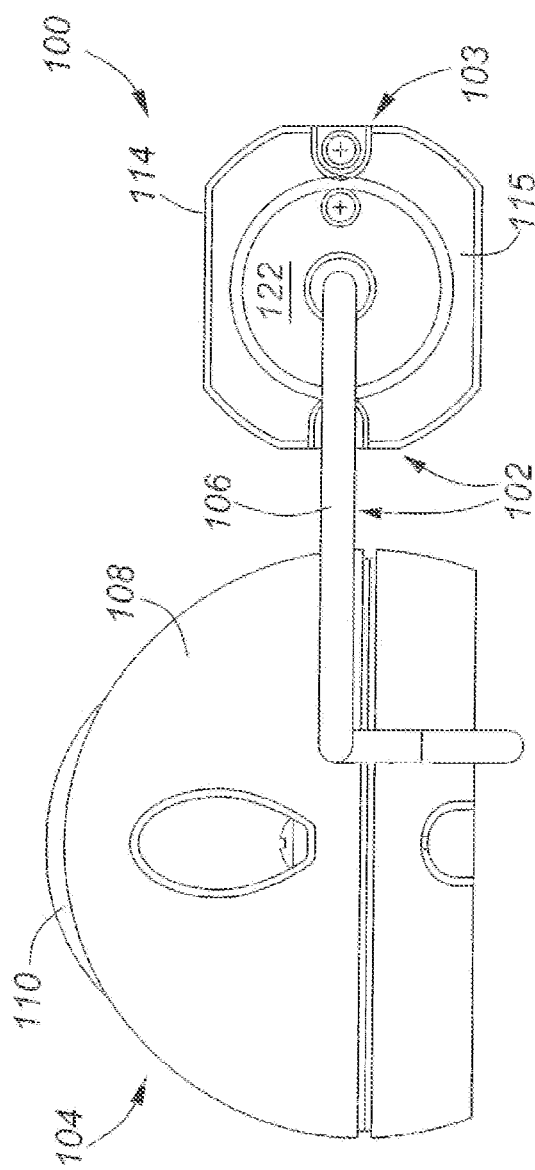
FIG. 1(b)
FIG. 1(c)

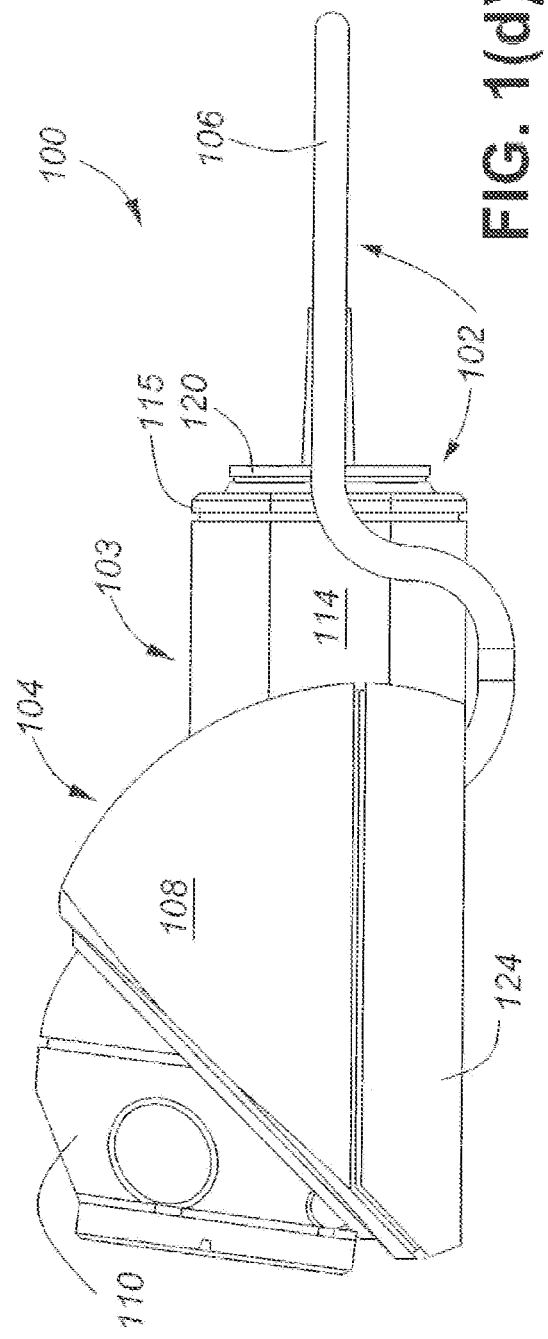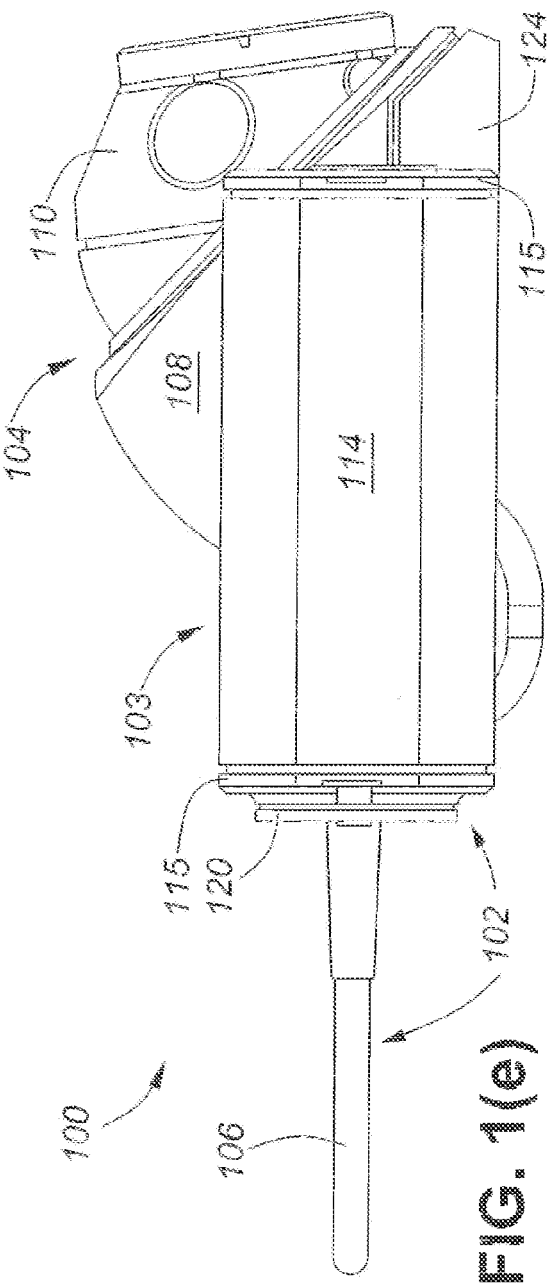

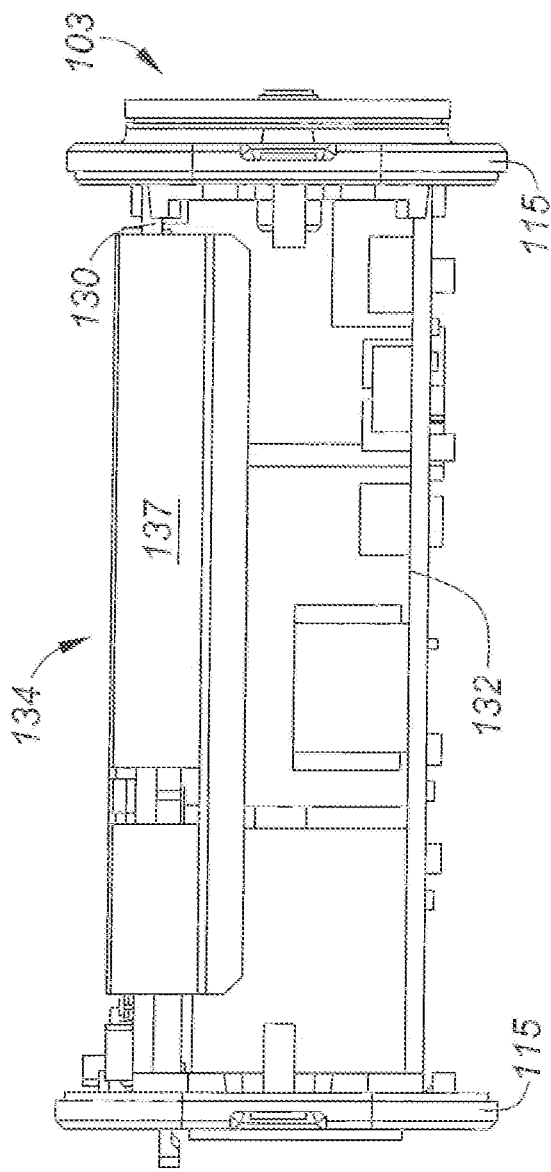
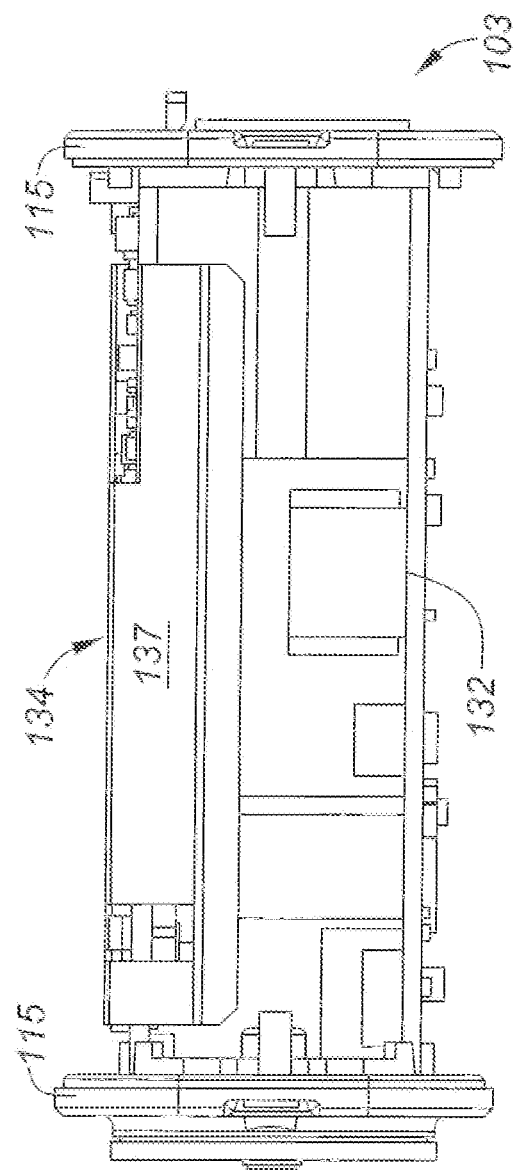
FIG. 4(a)
FIG. 4(b)

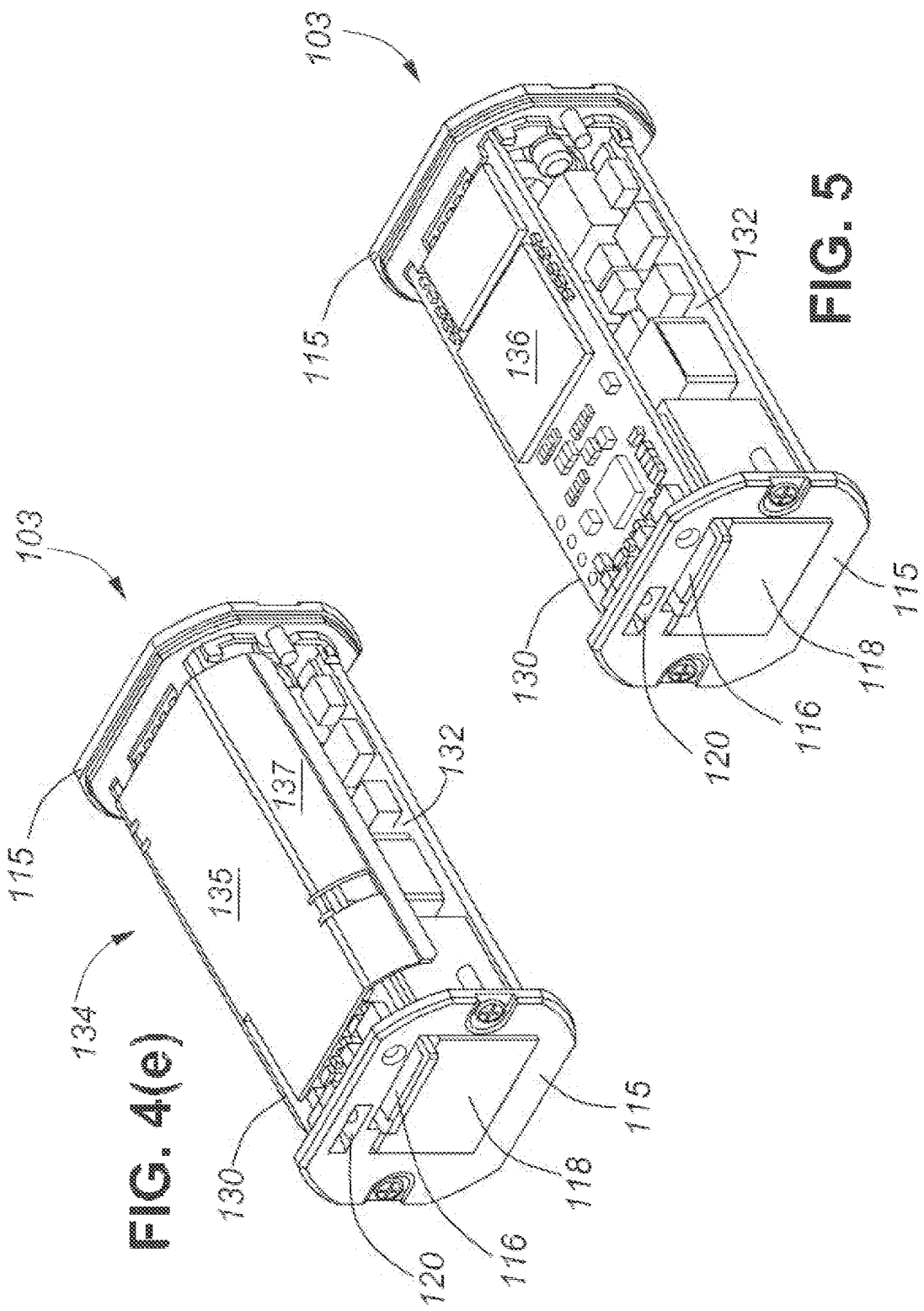

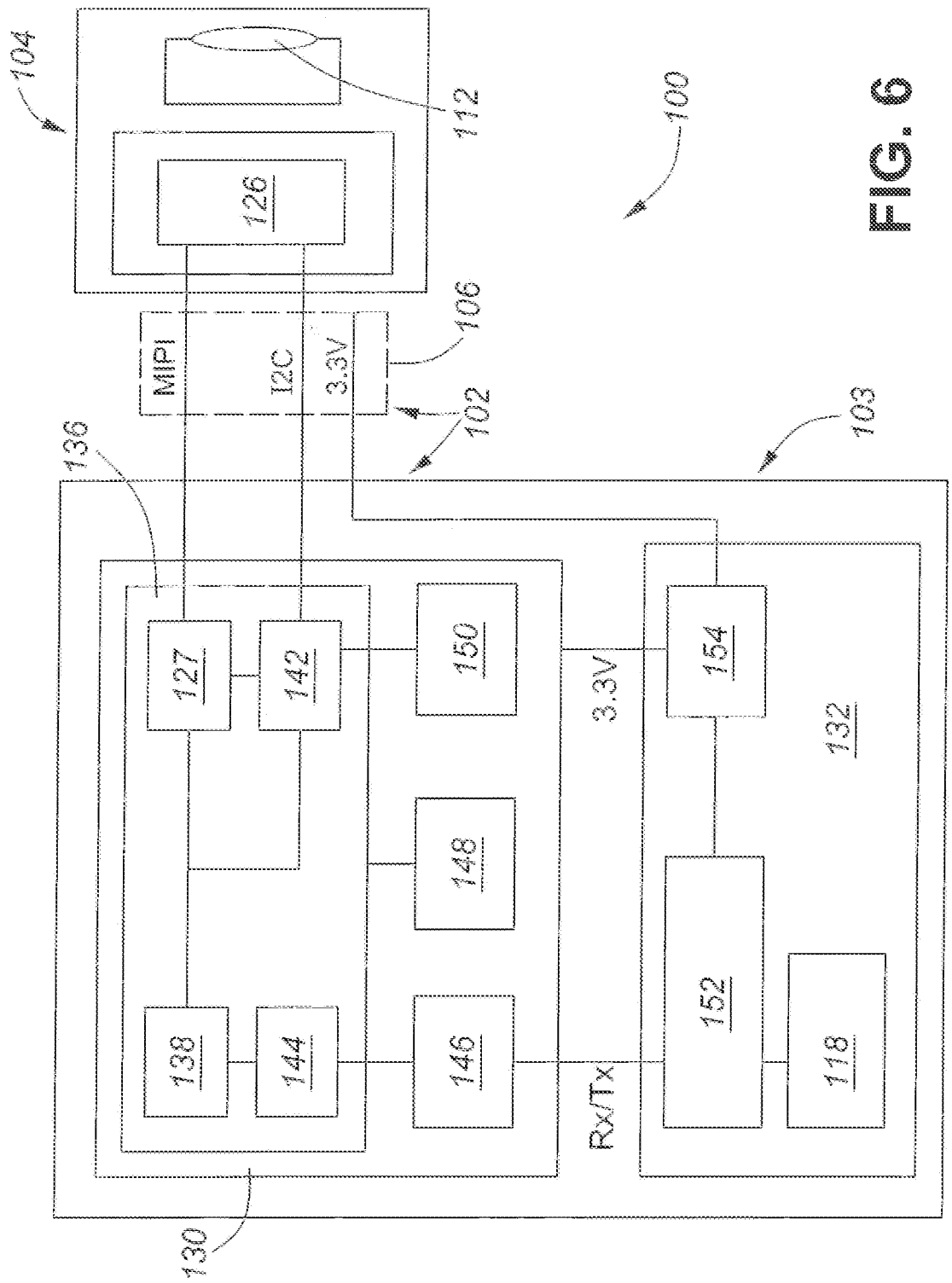

SECURITY CAMERA HAVING A CABLE ASSEMBLY WITH AN INTEGRATED PROCESSING MODULE

TECHNICAL FIELD

The present disclosure is directed at a security camera having a cable assembly with an integrated processing module. More particularly, the present disclosure is directed at a security camera having a camera head and a cable assembly with an integrated processing module that is sized to fit through an aperture that can be covered by the camera head.

BACKGROUND

One application of security cameras is to conduct surreptitious surveillance. To conduct surveillance surreptitiously a security camera typically needs to remain hidden from the people on whom the surveillance is being conducted. Miniaturizing a camera is one way to help it remain hidden; the smaller the camera, the more locations in which the camera may be placed to conduct the surveillance and the harder it is for the camera to be discovered. A continued focus of the security industry is accordingly miniaturizing security cameras in a manner that is not detrimental to ease of use or installation.

SUMMARY

According to a first aspect, there is provided a security camera that comprises a camera head and a cable assembly. The camera head comprises a lens and an image sensor, while the cable assembly comprises a cable connected to the camera head and a processing module connected to the camera head via the cable. The processing module comprises image processing circuitry communicative with the image sensor and power circuitry electrically coupled to the image processing circuitry and the camera head. The processing module is sized to fit through an aperture in a mounting surface that can be covered by the camera head when the camera head is mounted to the mounting surface.

The cable assembly may be sufficiently light to be supportable indefinitely solely by the camera head when the cable assembly is dangling from the camera head. Optionally, and depending on the weight of the processing module, the connection between one or both of i) the cable and the camera head and ii) the cable and the processing module may be reinforced such that the camera head is able to support the cable assembly.

The image processing circuitry may comprise an image processing printed circuit board (PCB) and the power circuitry may comprise a power PCB, wherein both of the PCBs may be housed within the processing module.

The PCBs may be opposite each other. Alternatively or additionally, the PCBs may be parallel to each other. Additionally or alternatively, they may have identical dimensions.

The image processing circuitry may comprise a processor and the heat spreader may be attached to the processor.

The heat spreader may comprise a planar member extending longitudinally along the processing module and over the image processing PCB, and two wing members connected to opposite edges of the planar member and extending past the side edges of the image processing PCB.

The wing members may terminate in a space between the image processing and power PCBs.

The cable may comprise a jacketed micro-coaxial cable having multiple conductors.

The camera head may consists essentially of the lens and image sensor.

According to another aspect, there is provided a security camera that comprises a camera head and a cable assembly. The camera head comprises a lens and an image sensor. The cable assembly comprises a cable connected to the camera head and a processing module connected to the camera head via the cable. The processing module comprises image processing circuitry communicative with the image sensor and comprising an image processing printed circuit board (PCB), an power circuitry electrically coupled to the image processing circuitry and the camera head and comprising a power PCB. The image processing PCB and power PCB are positioned parallel to and opposite each other and the processing module is sized to fit through an aperture in a mounting surface that can be covered by the camera head when the camera head is mounted to the mounting surface. Additionally or alternatively, the cable assembly is sufficiently light to be supportable indefinitely solely by the camera head when the cable assembly is dangling from the camera head. Optionally, and depending on the weight of the processing module, the connection between one or both of i) the cable and the camera head and ii) the cable and the processing module may be reinforced such that the camera head is able to support the cable assembly.

The image processing circuitry may comprise a processor laid out on the image processing PCB and the processing module may further comprise a heat spreader attached to the processor.

According to another aspect, there is provided a method for mounting a security camera comprising a camera head and a cable assembly. The method comprises drilling an aperture in a mounting surface, wherein the aperture is sized to allow the cable assembly to pass through it and to be coverable by the camera head when the camera head is secured to the mounting surface; connecting the camera to a network via the cable assembly; inserting the cable assembly through the aperture, and securing the camera head to the mounting surface such that the camera head covers the aperture. The cable assembly comprises a cable connected to the camera head and a processing module connected to the camera head via the cable.

The cable assembly may be sufficiently light to be supportable indefinitely solely by the camera head when the cable assembly is dangling from the camera head.

The processing module may comprise image processing circuitry communicative with the image sensor, wherein the image processing circuitry comprises an image processing printed circuit board (PCB); and power circuitry electrically coupled to the image processing circuitry and the camera head, wherein the power circuitry comprises a power PCB and wherein both of the PCBs are housed within the processing module.

The PCBs may be opposite each other. Additionally or alternatively, they may be parallel to each other. Additionally or alternatively, they may have identical dimensions.

The processing module may further comprise a heat spreader attached to the image processing circuitry.

The image processing circuitry may comprise a processor and the heat spreader may be attached to the processor.

The cable may comprise a jacketed micro-coaxial cable having multiple conductors.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIGS. 1(a)-(g) are perspective, front elevation, rear elevation, right side elevation, left side elevation, top plan, and bottom plan views, respectively, of a security camera having a camera head and a cable assembly, according to one embodiment.

FIGS. 4(a)-(e) are right side elevation, left side elevation, top plan, bottom plan, and perspective views, respectively, of a processing module of the security camera, with the processing module's module housing removed.

FIG. 5 is a perspective view of the processing module of FIGS. 4(a)-(e) without its module housing and without a heat spreader.

FIG. 6 is a block diagram of the security camera.

DETAILED DESCRIPTION

Figure 1A:
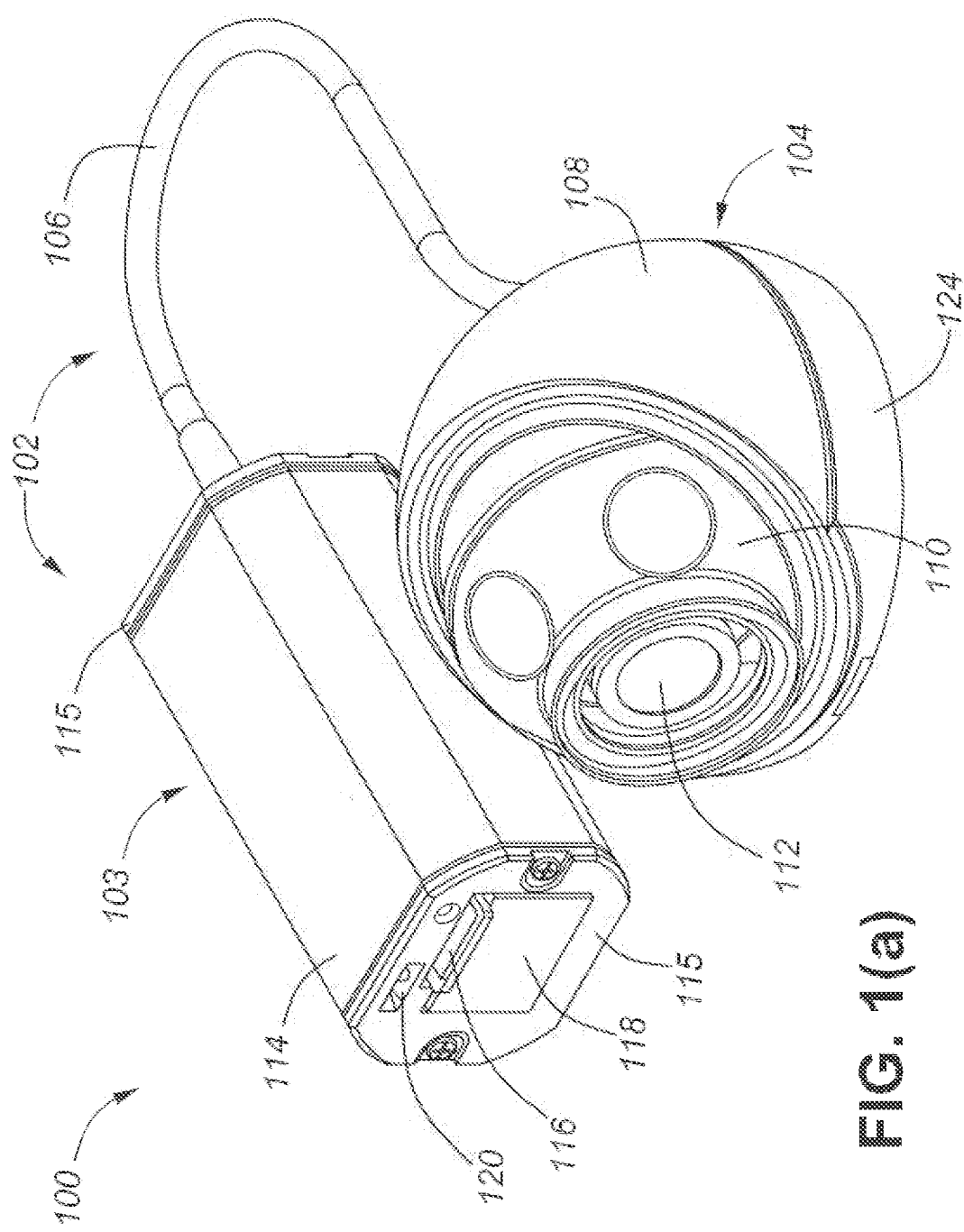
Figure 1F:
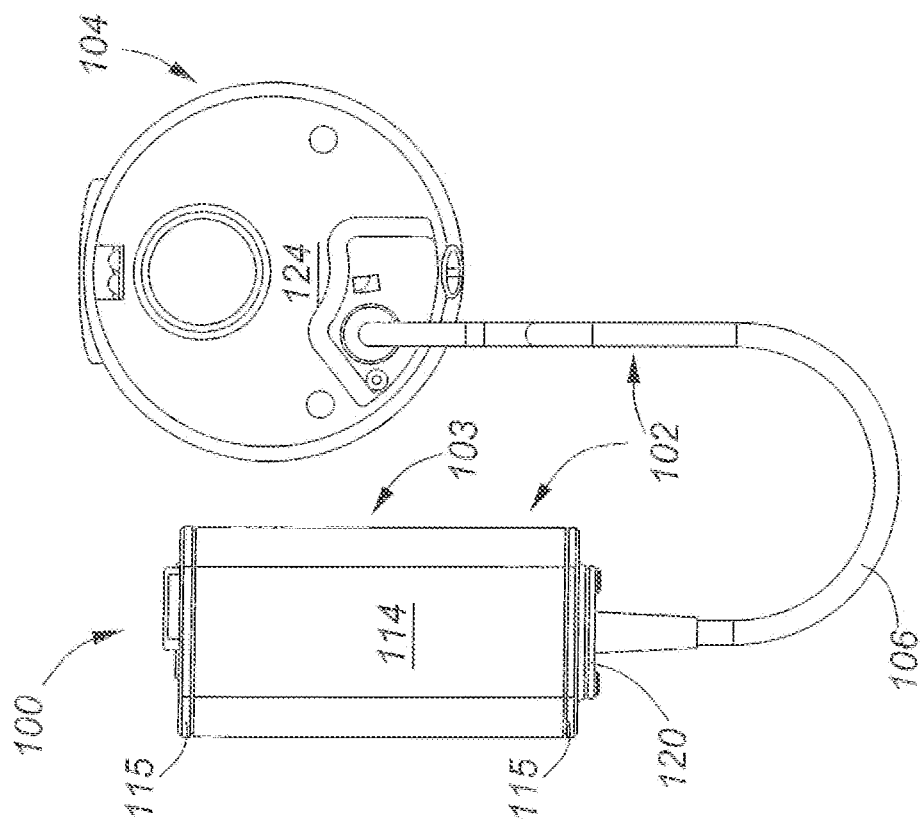
Figure 1G:
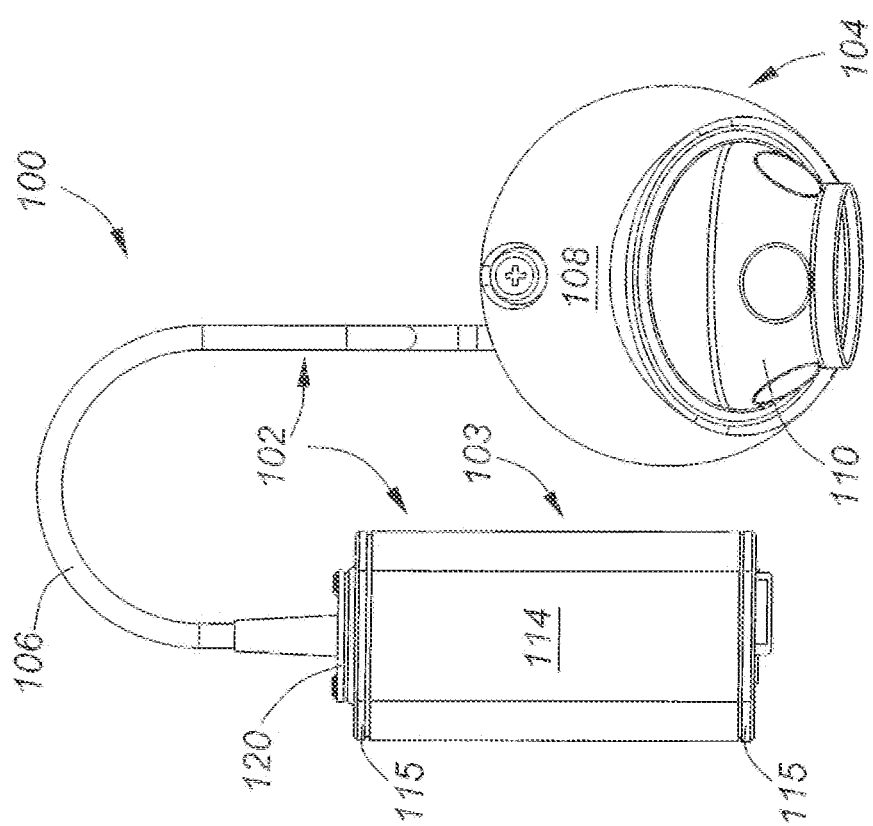

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

The security industry has attempted to miniaturize cameras in several ways. One way is by separating the electro-optics in a camera from the image processing circuitry in the camera. This allows the image processing circuitry, which can be relatively bulky, to be located remotely from the electro-optics, which typically comprise a relatively small lens and image sensor. The image processing circuitry is contained within a processing module and the electro-optics are contained within a camera head spaced from the processing module. The camera head, which is the portion of the camera visible to surveillance subjects, can accordingly be manufactured smaller than if the electro-optics and image processing circuitry were both contained within the camera head. A cable connects the processing module and the camera head, and the camera is connected to a network via the processing module. In the case of an Internet protocol (IP) camera, the camera is connected to an IP network.

While separating the electro-optics and image processing circuitry permits manufacturing of a relatively small camera head, it also requires technicians who are installing the camera to have to deal with a relatively bulky processing module. A conventional processing module is large enough that the technician mounts both the camera head and the processing module to one or more mounting surfaces because the processing module is too large and heavy to be left dangling from the camera head following installation or to fit through a hole that can subsequently be covered by the camera head. The technician therefore cannot install the camera having a distinct processing module and camera head in the same way as he or she can install an integrated camera in which all electronics and optical equipment are contained within the camera head. For an integrated camera, the technician simply needs to mount the camera head to a mounting surface and connect the camera head to the network; if the camera is an IP camera, the network is frequently used to power the camera as well as for communication. In contrast, to install the camera having a distinct processing module and camera head, the technician identifies a concealed location in which to mount the processing module, separately mounts the processing module and camera head, connects the camera head to the processing module, and then connects the processing module to the IP network.

The present disclosure is directed at embodiments of a security camera that comprise a distinct processing module and camera head connected by a cable, but in which the processing module is small and light enough that the technician does not need to mount both the processing module and the camera head when mounting the camera. The technician simply drills an aperture, connects the processing module to the network, inserts the processing module through the aperture, and then covers the aperture using the camera head by mounting the camera head to the mounting surface and over the aperture. The processing module is light enough to dangle freely from the camera head by the cable that connects the two. The processing module is effectively transparent to the technician, since he or she can simply connect the camera to the network and mount the camera head to the mounting surface, analogous to what he or she would do when installing a camera in which all electronics and optics are contained within the camera head. While the depicted camera is an IP camera, alternative embodiments (not depicted) include non-IP cameras, such as analog cameras, as well.

Referring now to FIGS. 1(a)-(g), there are shown perspective, front elevation, rear elevation, right side elevation, left side elevation, top plan, and bottom plan views, respectively, of a security camera 100 having a camera head 104 and a cable assembly 102, according to one embodiment. The cable assembly 102 includes a processing module 103 and a cable 106 that connects the processing module 103 and the camera head 104. The camera 100 depicted herein is a dome camera; however, in alternative embodiments (not depicted), the camera 100 may be another type of camera, such as a box camera, pinhole camera, or bullet camera.

The camera head 104 comprises a dome base 124 on which is attached a dome cover 108. An opening in the dome cover 108 and base 124 allows an eyeball camera 110, which rests on the base 124, to protrude out the front of the dome cover 108. At the front of the eyeball camera 110 is the camera 100's lens 112. The lens 112 focuses light on to an image sensor 126 (shown in FIG. 3) mounted within the eyeball camera 110. As discussed in more detail in respect of FIG. 3 below, a micro-coaxial cable 106 connects the eyeball camera 110 to the processing module 103, which processes the video signal that the image sensor 126 outputs.

In FIGS. 1(a)-(g) only the exterior of the processing module 103 is visible. The top, bottom, left, and right sides of the processing module 103 are defined by a module housing 114, while front and rear end plates 115 cap the ends of the processing module 103. The micro-coaxial cable 106 is connected to the processing module 103's rear end plate 115. A waterproof grommet 122 circumscribes the end of the micro-coaxial cable 106 that terminates at the processing module 103 and is screwed into the rear end plate 115 to ensure a water tight seal. The processing module 103's front end plate 115 has a network jack in the form of an RJ45 (Ethernet) jack 118 to receive an RJ45 plug that connects the camera 100 to the IP network. As discussed in more detail in respect of FIG. 6 below, power over Ethernet (PoE) technology is used to also power the camera 100 via the RJ45 jack. A pair of LEDs 120 indicating connection and link status and a memory card slot 116 are also present on the front end plate 115.

Figure 2:
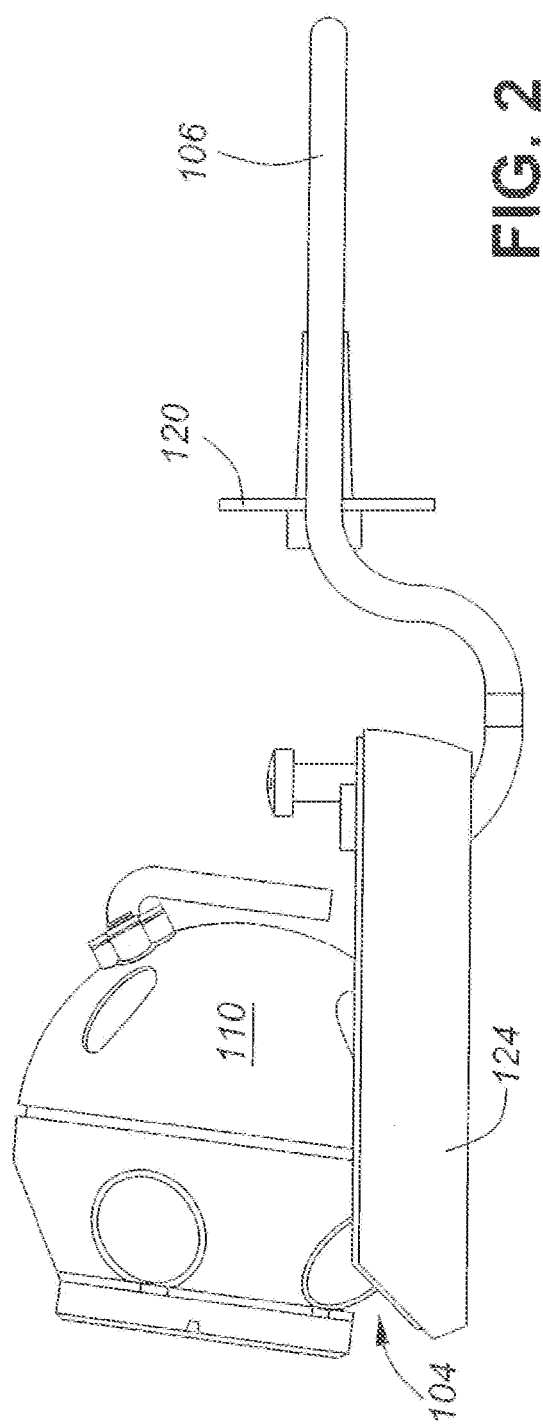
FIG. 2 is a right side elevation view of the security camera with a dome cover of the camera head removed.
Figure 3:
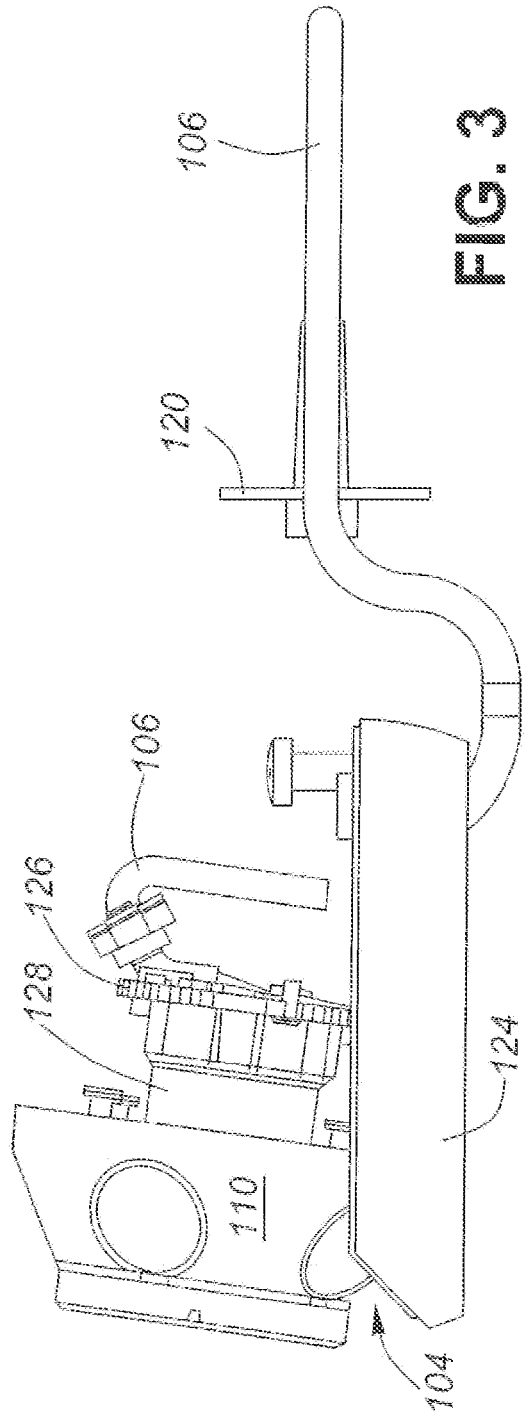
FIG. 3 is a right side elevation view of the security camera with the dome cover of the camera head removed and a rear shell of an eyeball camera, which forms part of the camera head, also removed.

Referring now to FIGS. 2 and 3, there are shown right side elevation views of the camera 100. More specifically, FIG. 2 shows a right side elevation view of the camera 100 with the dome cover 108 removed, while FIG. 3 shows a right side elevation view of the camera with the dome cover 108 removed and with a rear shell of the eyeball camera 110 removed, revealing the circuitry contained within the eyeball camera 110. Inside the eyeball camera 110 is a lens mount 128 that is connected to the image sensor 126. The micro-coaxial cable 106 is electrically coupled to the image sensor 126 via an I-PEX 20373-series connector, which is also used to couple the micro-coaxial cable 106 to the processing module 103. The image sensor is an Aptina™ AR0330 sensor that outputs a high-speed serial data stream along the micro-coaxial cable 106 using the MIPI® protocol. The micro-coaxial cable 106 is jacketed with thermoplastic polyurethane and includes fourteen conductors to facilitate high-speed serial communication. In alternative embodiments (not depicted), the micro-coaxial cable 106 may be manufactured using a different number of conductors or a different jacket material so long as communication between the processing module 103 and camera head 104 can be performed sufficiently quickly to transfer the video signal that the image sensor 126 outputs.

FIG. 6 shows a block diagram of the camera 100. The lens 112 and image sensor 126 are shown as being located within the camera head 104. The processing module 103 includes a system on a chip (SoC) 136 that comprises a processor 138, an image signal processor (ISP) 127, a Media Access Controller (MAC) 144, and an I²C interface 142. The processor 138 is communicative with each of the ISP 127, MAC 144, and I²C interface 142. FIG. 6 illustrates the three different ways the processing module 103 is electrically coupled to the camera head 104. One, as discussed above, the ISP 127 is communicative with the image sensor 126 via the MIPI® protocol; two, the I²C interface 142 is communicative with the image sensor 126 using the I²C protocol; and three, the camera head 104 is powered with a 3.3 V power supply line from the processing module 103. These three forms of electrical coupling take place via the micro-coaxial cable 106. The I²C interface 142 is used to control camera parameters such as gain, exposure, and frame rate.

The SoC 136 comprises part of the camera 100's image processing circuitry, which comprises part of and is laid out on an image processing printed circuit board (PCB) 130. In addition to the SoC 136, on the image processing PCB 130 are a physical layer integrated circuit (PHY) 146 that is communicative with the MAC 144; flash memory 148, which is an exemplary non-transitory computer readable medium that is non-volatile and that stores statements and instructions to cause the SoC 136 to perform tasks such as image processing; and RAM 150, which is another exemplary non-transitory computer readable medium, but which is volatile and which the SoC 136 uses to temporarily store information and for working space while performing tasks.

Also located within the processing module 103 is power circuitry, which comprises part of and is laid out on a power PCB 132. On the power PCB 132 is the RJ45 jack 118; Ethernet magnetics 152, which are communicative with the RJ45 jack 118 and the PHY 146; and a DC to DC converter 154, electrically coupled to the Ethernet magnetics 152, that outputs a 3.3 V signal to power the image processing circuitry and the camera head 104. The camera 100 is powered using PoE technology, although in alternative embodiments (not depicted) the camera 100 may be powered using, for example, an AC adapter or with batteries.

Separating the power circuitry from the image processing circuitry by placing them on their own PCBs 130,132 permits the dimensions of the processing module 103 to be relatively small; for example, the depicted processing module 103 is approximately 24 mm (0.94 inches)×28 mm (1.1 inches)×57 mm (2.2 inches). If all the image processing and power circuitry were on the same PCB, the processing module 103 would be approximately twice as wide or long.

One issue that arises during design of the processing module 103 is ensuring sufficient heat dissipation to prevent components from overheating; in the depicted embodiment the processing module 103 is designed to operate within the maximum recommend operating temperatures of all circuit components, and in particular the SoC 136, while operating at an ambient temperature of 50° C. The SoC 136 on the image processing PCB 130, and to a lesser degree the DC to DC converter 154 on the power PCB 132, generate relatively large amounts of heat compared to the other circuit components on the PCBs 130,132 during operation. Keeping them on separate PCBs 130,132 helps to spread the heat throughout the processing module 103 and helps keep the processing module 103 at an acceptable operating temperature.

Figure 4C:
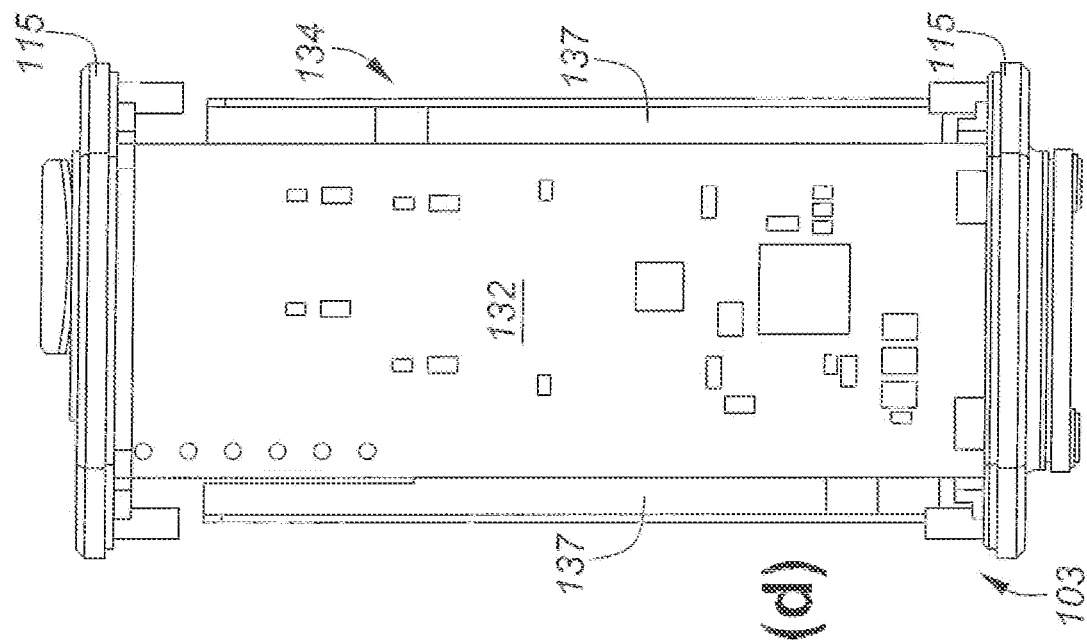
Figure 4D:
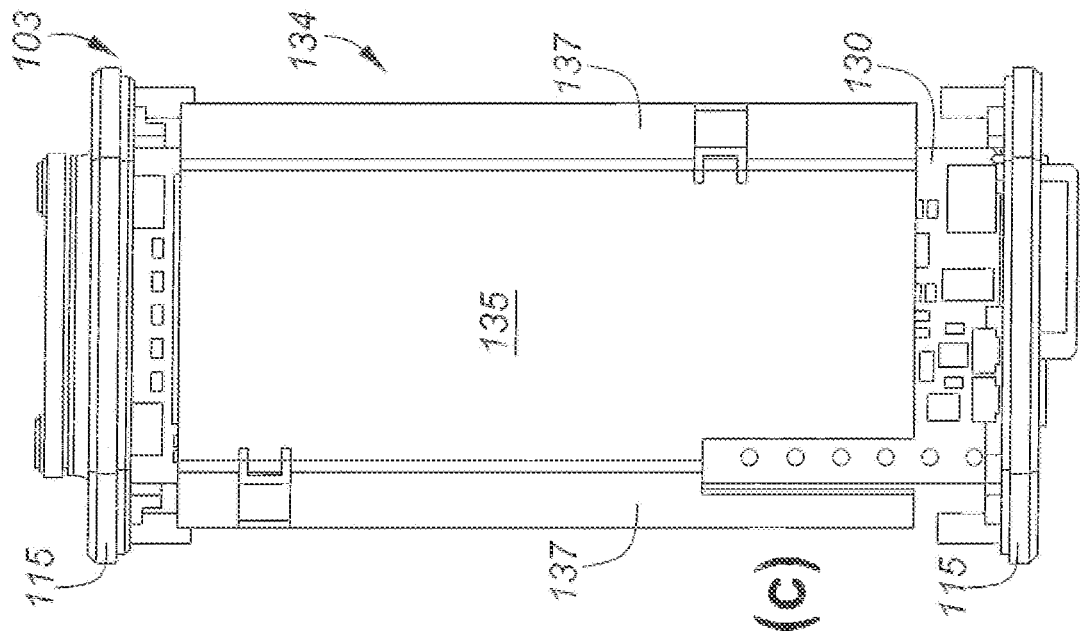

FIGS. 4(*a*)-(*e*) are right side elevation, left side elevation, top plan, bottom plan, and perspective views, respectively, of the processing module 103 without the module housing 114. These figures show a particular manner in which the PCBs 130,132 are separated; that is, they are spaced opposite and parallel each other. In particular, in the depicted embodiment the PCBs 130,132 are identically sized and the planar surfaces of each of the PCBs 130,132 are placed opposite each other such that a line extending perpendicularly from the planar surface of one of the PCBs 130,132 perpendicularly intersects the planar surface of the other of the PCBs 130,132. While the depicted processing module 103 shows the PCBs 130,132 spaced opposite and parallel each other and the two PCBs 130,132 as identically sized, in alternative embodiments (not depicted) the PCBs 130,132 may be one or both of arranged and sized differently. For example, the PCBs 130, 132 may be spaced non-parallel to each other; they may have different dimensions or surface areas; or they may not entirely overlap.

FIGS. 4(*a*)-(*e*) also show how the processing module 103 incorporates a heat spreader 134 to increase heat dissipation. The heat spreader 134 is affixed to the top of the SoC 136, which is adjacent the underside of the top of the module housing 114. The heat spreader 134 comprises a planar member 135 extending longitudinally along the processing module 103 and over the top of the image processing PCB 130, and two wing members 137 connected to opposite edges of the planar member 135 and extending downwards past the left and right side edges of the image processing PCB 130. The wing members 137 terminate in the space between the two PCBs 130,132. FIG. 5 is a perspective view of the processing module of FIGS. 4(*a*)-(*e*) without its module housing 114 and without the heat spreader 134, and shows the SoC 136 to which the heat spreader 134 is attached. In FIGS. 4(*a*)-(*e*) the wing members 137 are curved; however, in alternative embodiments (not depicted), the wing members 137 may be planar. Similarly, in alternative embodiments (not depicted) the planar member 135 may be replaced with a non-planar member.

Figure 7B:
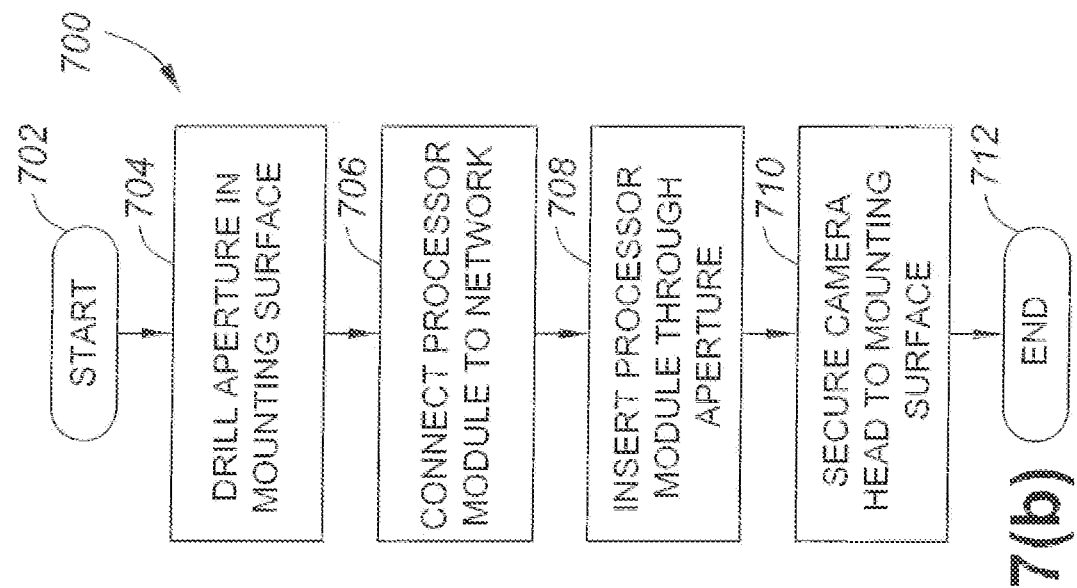
FIG. 7(b) is a flowchart depicting a method for mounting the security camera to the mounting surface, according to another embodiment.
Figure 7A:
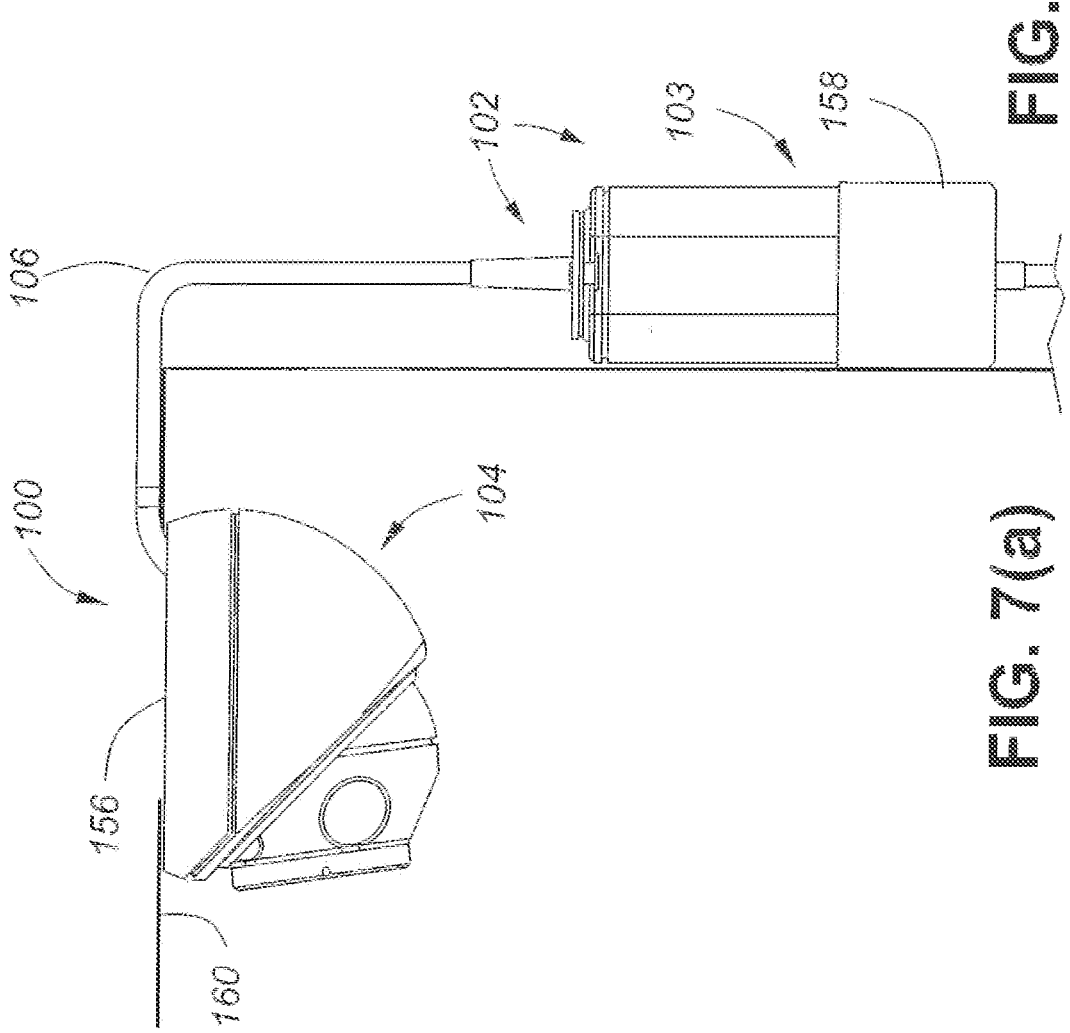
FIG. 7(a) is a side sectional view of a mounting surface showing the security camera installed on to the mounting surface.

Referring now to FIGS. 7(*a*) and (*b*), there are respectively shown a side sectional view of a mounting surface 160 showing the camera 100 installed on to the mounting surface 160 and a flowchart depicting an exemplary method 700 for mounting the security camera to the mounting surface 160. To install the camera 100, the technician begins the method 700 (block 702) and drills an aperture 160 into the mounting surface (block 704). The aperture 160 is sized to allow the cable assembly 102 to pass through it and to be able to be covered by the dome base 124. The technician then connects the processor module 103 to the network (block 706); in FIG. 7(*a*), the RJ45 plug is jacketed in a boot 158, which is visible on the exterior of the processing module 103. In addition to giving the camera 100 the ability to transmit video signals, connecting the camera 100 to the network also powers the camera 100. After connecting the camera 100 to the network the technician inserts the processor module 103, along with the rest of the cable assembly 102, through the aperture 156 (block 708) and then covers the aperture 156 by mounting the camera head 104 on to the mounting surface 160 and over the aperture 156 such that it covers the aperture 156 (block 710). After the camera head 104 has been secured to the mounting surface 160, the mounting process is complete (block 712).

This installation process is substantially similar to the process used to install a conventional dome camera in which all the electronics and optics are contained within the camera head in that only the camera head 104 is mounted. Consequently, the processing module 103 is functionally transparent to the technician and the technician is able to install the depicted miniaturized dome camera 100 without having to separately mount the processing module 103. In alternative cameras with relatively bulky and heavy processing modules, while the extra size in the processing module makes heat dissipation much less of a concern it also requires that the processing module be mounted separately from the camera head and makes it impractical to fit the processing module through an aperture that can subsequently be covered by the camera head.

In FIG. 7(*a*), the mounting surface 160 is a portion of a ceiling near the corner of a room, and the processing module 103 hangs down a wall nearby the ceiling. The processing module 103's small size makes it relatively light, which permits the processing module 103 to be supportable indefinitely solely by the camera head 104 when the camera 100 is mounted; in the depicted embodiment, the processing module 103 has a weight of approximately 36 g (1.3 ounces), while the total weight of the camera 100 is approximately 75 g (2.6 ounces). In the depicted embodiment, the grommet 122 reinforces the connection between the micro-coaxial cable 106 and the processing module 103, which facilitates the ability of the processing module 103 to dangle from the camera head 104. In alternative embodiments (not depicted), the connection between the micro-coaxial cable 106 and one or both of the camera head 104 and processing module 103 may be reinforced in any one or more of several different ways, such as by increasing the resiliency of the jacketing on the micro-coaxial cable 106 or by increasing the number of fasteners used to secure the micro-coaxial cable 106 to the camera head 104 and processing module 103. Furthermore, in alternative embodiments (not depicted), the processing module 103 may be secured to the mounting surface 160 behind the camera head 104 or to some other surface out of sight of the surveillance subjects; for example, one side of the processing module 103 may have an adhesive on it that secures it in place behind the mounting surface 160. In another alternative embodiment (not depicted), the processing module 103 may be too heavy to dangle free indefinitely from the camera head 104, in which case either the processing module 103 can be affixed to a surface for support or rested on a flat surface during use, such as on the side of the mounting surface 160 opposite to the side on which the camera head 104 is secured.

As mentioned above, if all the image processing and power circuitry were on the same PCB the processing module 103 would be approximately twice as wide or long. The camera head 104 would accordingly have to be increased in size in order to cover the aperture 156 that would have to be made to accommodate this larger processing module 103, which would make the camera head 104 easier for surveillance subjects to discover.

While in the depicted embodiments the micro-coaxial cable 106 is permanently coupled to the processor module 103 (i.e., it is not designed to be removed from the processor module 103 during normal use of the camera 100), in alternative embodiments (not depicted) this may not be the case. For example, in an alternative embodiment the micro-coaxial cable 106 may be detachably coupled to the processing module 103 using, for example, a plug and socket connection.

While the SoC 136 is used in the foregoing embodiments, in alternative embodiments (not depicted) the SoC 136 may instead be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, and semiconductor based media such as flash media, random access memory, and read only memory.

It is contemplated that any part of any aspect or embodiment discussed in this specification can be implemented or combined with any part of any other aspect or embodiment discussed in this specification.

FIG. 7(*b*) is a flowchart of an exemplary method. Some of the blocks illustrated in the flowchart may be performed in an order other than that which is described. Also, it should be appreciated that not all of the blocks described in the flow chart are required to be performed, that additional blocks may be added, and that some of the illustrated blocks may be substituted with other blocks.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A security camera, comprising:
   (a) a camera head comprising a lens and an image sensor; and
   (b) a cable assembly comprising:
      (i) a cable connected to the camera head; and
      (ii) a processing module connected to the camera head via the cable, the processing module comprising:
         (1) image processing circuitry communicative with the image sensor; and
         (2) power circuitry electrically coupled to the image processing circuitry and the camera head, wherein the processing module is sized to fit through an aperture in a mounting surface that can be covered by the camera head when the camera head is mounted to the mounting surface.

2. The security camera of claim 1 wherein the cable assembly is sufficiently light to be supportable solely by the camera head when the cable assembly is dangling from the camera head.

3. The security camera of claim 1 wherein the image processing circuitry comprises an image processing printed circuit board (PCB) and the power circuitry comprises a power PCB, and wherein both of the PCBs are housed within the processing module.

4. The security camera of claim 3 wherein the PCBs are opposite each other.

5. The security camera of claim 4 wherein the PCBs are parallel to each other.

6. The security camera of claim 3 wherein the processing module further comprises a heat spreader attached to the image processing circuitry.

7. The security camera of claim 6 wherein the image processing circuitry comprises a processor and the heat spreader is attached to the processor.

8. The security camera of claim 6 wherein the heat spreader comprises:
    (a) a planar member extending longitudinally along the processing module and over the image processing PCB; and
    (b) two wing members connected to opposite edges of the planar member and extending past the side edges of the image processing PCB.

9. The security camera of claim 8 wherein the wing members terminate in a space between the image processing and power PCBs.

10. The security camera of claim 1 wherein the cable comprises a jacketed micro-coaxial cable having multiple conductors.

11. The security camera of claim 1 wherein the camera head consists essentially of the lens and image sensor.

12. A security camera, comprising:
    (a) a camera head comprising a lens and an image sensor; and
    (b) a cable assembly comprising:
        (i) a cable connected to the camera head; and
        (ii) a processing module connected to the camera head via the cable, the processing module comprising:
            (1) image processing circuitry communicative with the image sensor and comprising an image processing printed circuit board (PCB); and
            (2) power circuitry electrically coupled to the image processing circuitry and the camera head and comprising a power PCB, wherein the image processing PCB and power PCB are positioned parallel to and opposite each other, the processing module is sized to fit through an aperture in a mounting surface that can be covered by the camera head when the camera head is mounted to the mounting surface.

13. The camera of claim 12 wherein the image processing circuitry comprises a processor laid out on the image processing PCB and wherein the processing module further comprises a heat spreader attached to the processor.

14. A method for mounting a security camera comprising a camera head and a cable assembly, the method comprising:
    (a) drilling an aperture in a mounting surface, wherein the aperture is sized to allow the cable assembly to pass through it and to be coverable by the camera head when the camera head is secured to the mounting surface;
    (b) connecting the camera to a network via the cable assembly, wherein the cable assembly comprises:
        (i) a cable connected to the camera head; and
        (ii) a processing module connected to the camera head via the cable;
    (c) inserting the cable assembly through the aperture; and
    (d) securing the camera head to the mounting surface such that the camera head covers the aperture.

15. The method of claim 14 wherein the cable assembly is sufficiently light to be supportable solely by the camera head when the cable assembly is dangling from the camera head.

16. The method of claim 14 wherein the processing module comprises:
    (a) image processing circuitry communicative with an image sensor comprising part of the camera head, wherein the image processing circuitry comprises an image processing printed circuit board (PCB); and
    (b) power circuitry electrically coupled to the image processing circuitry and the camera head, wherein the power circuitry comprises a power PCB and wherein both of the PCBs are housed within the processing module.

17. The method of claim 16 wherein the PCBs are opposite and parallel to each other.

18. The method of claim 16 wherein the processing module further comprises a heat spreader attached to the image processing circuitry.

19. The method of claim 18 wherein the image processing circuitry comprises a processor and the heat spreader is attached to the processor.

20. The method of claim 14 wherein the cable comprises a jacketed micro-coaxial cable having multiple conductors.

* * * * *